(12) United States Patent
Bulzacchelli et al.

(10) Patent No.: US 10,033,270 B2
(45) Date of Patent: Jul. 24, 2018

(54) DYNAMIC VOLTAGE REGULATION

(71) Applicant: International Business Machines Corporation, Armonk, NY (US)

(72) Inventors: John F. Bulzacchelli, Somers, NY (US); Seongwon Kim, Old Tappan, NJ (US); Michael A. Sperling, Poughkeepsie, NY (US); Zeynep Toprak Deniz, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/334,385

(22) Filed: Oct. 26, 2016

(65) Prior Publication Data

US 2018/0115238 A1    Apr. 26, 2018

(51) Int. Cl.
*G05F 3/02*    (2006.01)
*H02M 3/07*    (2006.01)

(52) U.S. Cl.
CPC .................................. *H02M 3/07* (2013.01)

(58) Field of Classification Search
None
See application file for complete search history.

(56) References Cited

U.S. PATENT DOCUMENTS

| | | | |
|---|---|---|---|
| 7,135,842 B2 | 11/2006 | Banerjee et al. | |
| 7,345,495 B2 | 3/2008 | Dangelo et al. | |
| 8,426,924 B2 | 4/2013 | Jwalant et al. | |

(Continued)

FOREIGN PATENT DOCUMENTS

| | | |
|---|---|---|
| EP | 0890895 A2 | 1/1999 |
| EP | 2259161 A2 | 12/2010 |

(Continued)

OTHER PUBLICATIONS

Chiu et al., "A 0.6V Resistance-Locked Loop Embedded Digital Low Dropout Regulator in 40nm CMOS with 77% Power Supply Rejection Improvement", 2013 Symposium on VLSI Circuits Digest of Technical Papers, 978-4-86348-348-4, printed on Jul. 27, 2016, 2 pages.

(Continued)

*Primary Examiner* — Lincoln Donovan
*Assistant Examiner* — Khareem E Almo
(74) *Attorney, Agent, or Firm* — Christopher K. McLane; Steven F. McDaniel (57) ABSTRACT

An apparatus for providing a local reference voltage for a voltage regulator includes a reference capacitor configured to provide the local reference voltage, a charge pump configured to push current to, or pull current from, the reference capacitor according to one or more control inputs received by the charge pump, and a boosting circuit configured to add or subtract a discrete quantity of charge to the reference capacitor according to one or more boosting control signals. A boosting control circuit may be configured to disconnect a boosting capacitor from the reference capacitor during a first phase of a control cycle and connect the boosting capacitor to the reference capacitor during a second phase of the control cycle. The boosting capacitor may be pre-charged (to add charge) or discharged (to subtract charge) during the first phase of the control cycle. A corresponding method is also disclosed herein.

18 Claims, 6 Drawing Sheets

(56) References Cited

U.S. PATENT DOCUMENTS

| | | | |
|---|---|---|---|
| 8,760,217 | B2 | 6/2014 | Chua-Eoan et al. |
| 8,841,893 | B2 | 9/2014 | Bulzacchelli et al. |
| 9,684,324 | B2* | 6/2017 | Conte .................... G05F 1/575 |
| 2008/0084239 | A1* | 4/2008 | Oswald .................. H02M 3/07 327/536 |
| 2012/0153910 | A1 | 6/2012 | Bulzacchelli et al. |
| 2013/0141068 | A1 | 6/2013 | Kay et al. |
| 2014/0070876 | A1 | 3/2014 | Paillet et al. |
| 2014/0084881 | A1 | 3/2014 | Shih et al. |
| 2015/0022173 | A1 | 1/2015 | Le et al. |
| 2015/0162834 | A1* | 6/2015 | Llewellyn ............. H02M 3/158 323/271 |
| 2015/0179247 | A1 | 6/2015 | Meinerzhagen et al. |
| 2015/0340950 | A1* | 11/2015 | Wibben ............. H05B 33/0845 323/288 |
| 2017/0005574 | A1* | 1/2017 | Wyland ................. H02M 3/158 |
| 2017/0248981 | A1* | 8/2017 | Conte .................... G05F 1/575 |

FOREIGN PATENT DOCUMENTS

| | | |
|---|---|---|
| EP | 2804067 A1 | 11/2014 |
| WO | 0219487 A3 | 3/2002 |

OTHER PUBLICATIONS

Fluhr et al., "POWER8TM: A 12-Core Server-Class Processor in 22nm SOI with 7.6Tb/s Off-Chip Bandwidth", ISSCC 2014 / Session 5 / Processors / 5.1, 2014 IEEE International Solid-State Circuits Conference, ISSCC 2014 / Feb. 10, 2014, 978-1-4799-0920-9/14, © 2014 IEEE, 3 pages.

Kim et al., "Enabling Wide Autonomous DVFS in a 22nm Graphics Execution Core Using a Digitally Controlled Hybrid LDO/ Switched-Capacitor VR with Fast Droop Mitigation", ISSCC 2015 / Session 8 / Low-Power Digital Techniques / 8.6, 2015 IEEE International Solid-State Circuits Conference, ISSCC 2015 / Feb. 24, 2015, 978-1-4799-6224-2/15, © 2015 IEEE, 3 pages.

Le et al., "A Sub-ns Response Fully Integrated Battery-Connected Switched-Capacitor Voltage Regulator Delivering 0.19W/mm2 at 73% Efficiency", ISSCC 2013 / Session 21 / Power Converters / 21.6, 2013 IEEE International Solid-State Circuits Conference, ISSCC 2013 / Feb. 20, 2013, 978-1-4673-4516-3/13, © 2013 IEEE, 3 pages.

Toprak-Deniz et al., "Distributed System of Digitally Controlled Microregulators Enabling Per-Core DVFS for the POWER8TM Microprocessor", ISSCC 2014 / Session 5 / Processors / 5.2, 2014 IEEE International Solid-State Circuits Conference, ISSCC 2014 / Feb. 10, 2014,978-1-4799-0920-9/14, © 2014 IEEE, 3 pages.

Bulzacchelli et al., "Dual-Loop System of Distributed Microregulators With High DC Accuracy, Load Response Time Below 500 ps, and 85-mV Dropout Voltage", IEEE Journal of Solid-State Circuits, vol. 47, No. 4, Apr. 2012, © 2012 IEEE, 12 pages.

Fluhr et al., "The 12-Core POWER8™ Processor With 7.6 Tb/s IO Bandwidth, Integrated Voltage Regulation, and Resonant Clocking", IEEE Journal of Solid-State Circuits, vol. 50, No. 1, Jan. 2015, © 2014 IEEE, 14 pages.

Shayan et al., "Parallel Flow to Analyze the Impact of the Voltage Regulator Model in Nanoscale Power Distribution Network", 10th Int'l Symposium on Quality Electronic Design, © 2009 IEEE, 6 pages.

\* cited by examiner

DYNAMIC VOLTAGE REGULATION

BACKGROUND OF THE INVENTION

The present invention relates generally to electronic circuits such as integrated circuits, and more particularly to dynamic voltage regulation in such circuits.

In general, a voltage regulator is a circuit that is designed to maintain a constant output voltage level as operating conditions change over time. Electronic circuits are often designed to operate with a constant DC supply voltage. A voltage regulator circuit provides a constant DC output voltage and ideally contains circuitry that continuously holds the output voltage at the desired value regardless of changes in load current or input voltage (assuming that the load current and input voltage are within the specified operating range for the regulator). Maintaining accurate voltage regulation is particularly challenging for processors when dynamic voltage frequency scaling (DVFS) is used to adjust the output voltage of the regulator and thereby control the level of power consumption and the throughput capacity of a processor.

SUMMARY

An apparatus for providing a local reference voltage for a voltage regulator includes a reference capacitor configured to provide the local reference voltage, a charge pump configured to push current to, or pull current from, the reference capacitor according to one or more control inputs for the charge pump, and a boosting circuit configured to add or subtract a discrete quantity of charge to the reference capacitor according to one or more boosting control signals. A boosting control circuit may be configured to disconnect a boosting capacitor from the reference capacitor during a first phase of a control cycle and connect the boosting capacitor to the reference capacitor during a second phase of the control cycle. The boosting capacitor may be precharged (to add charge) or discharged (to subtract charge) during the first phase of the control cycle. A corresponding method is also disclosed herein.

DETAILED DESCRIPTION

At least some of the embodiments disclosed herein recognize that integrated voltage regulation modules (iVRMs) such as those introduced in recent microprocessors provide an inexpensive path to per-core dynamic voltage and frequency scaling (DVFS) for power savings. At least some of the embodiments disclosed herein also recognize that the amount of power savings that can be saved with DVFS depends on how fast the regulated output voltage can be changed.

The cores and caches of certain processors use a power gating methodology similar to that used in previous generation processors. While in the previous generation processors, the power gating switches could operate in the 100% ON or OFF modes, some recent processors have the ability to re-use the power switch transistors to implement core-level linear voltage regulation. The linear regulation is achieved with distributed "micro-regulators", and the set point (reference level) of each micro-regulator is set with a local charge pump. An outer feedback loop is used to adjust each charge pump so that each micro-regulator regulates with high DC accuracy. Feedback to each charge pump is provided in the form of UP/DOWN currents (from a current DAC driven by UP/DOWN codes). To maintain robust stability, the bandwidth of the outer feedback loop is designed to be low by using small UP/DOWN currents. Unfortunately, these small UP/DOWN currents cannot change the charge pump voltages quickly, so truly rapid changes in the regulated output voltage cannot be achieved. At least some of the above issues are addressed in various embodiments disclosed herein.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following drawings, description and appended claims, or may be learned by the practice of the invention as set forth hereinafter.

Figure 1:
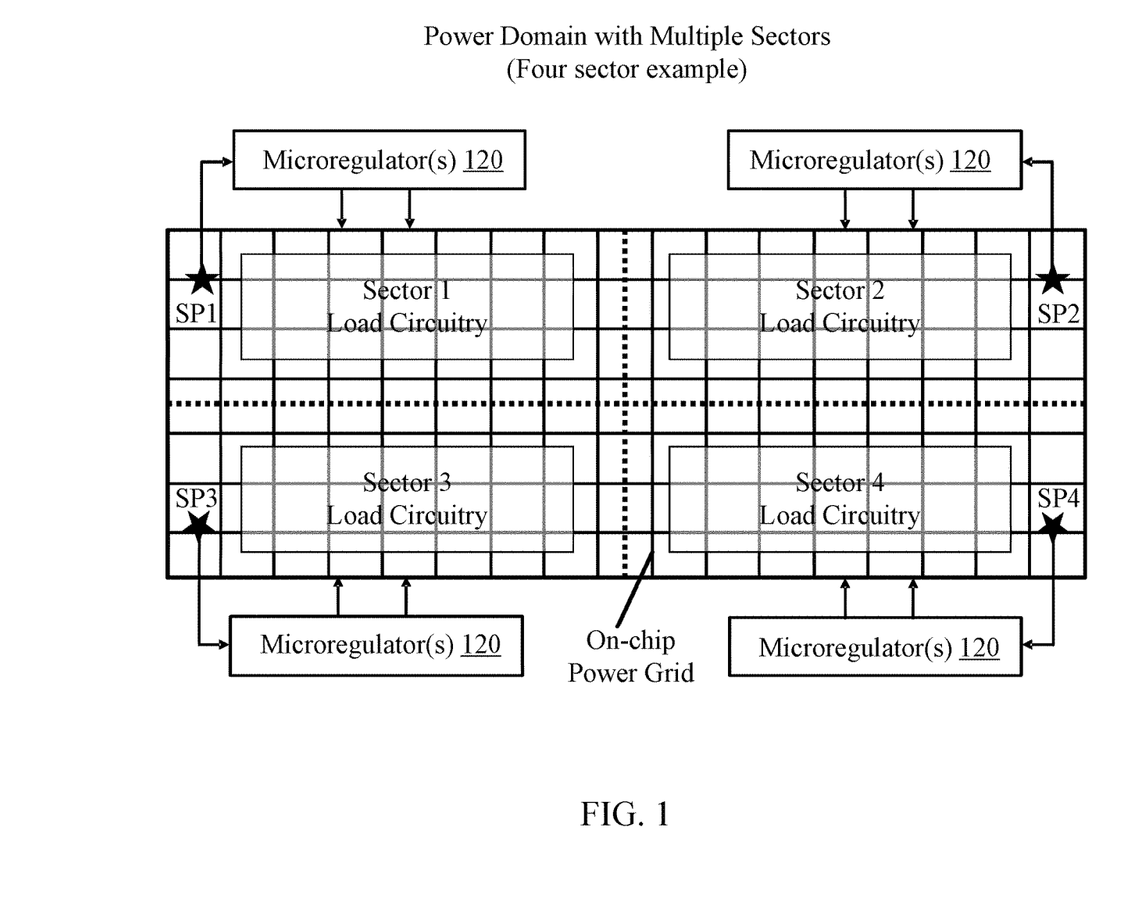
FIG. 1 depicts one example of an environment in which the present invention may be deployed.

FIGS. 1-4 depict one example of an environment in which the present invention may be deployed. As shown in FIG. 1, a single power domain of an integrated circuit may, in some embodiments, be divided into multiple sectors. Since all the circuits belong to the same power domain, they are all connected to a single (unbroken) power grid. While the grid itself is unbroken, different regions of the power grid (including the load circuitry in those regions) can be considered as distinct circuit sectors. The size of each circuit sector can be chosen to be small enough that the IR drop across one sector is negligible (e.g., <10 mV). Within each sector, the voltage of the supply grid can be sensed with a dedicated sense point: e.g., SP1 for sector 1, SP2 for sector 2, and so on. The voltages at these sense points can then be used to adjust one or more micro-regulators 120 associated with the respective circuit sectors.

Figure 2:
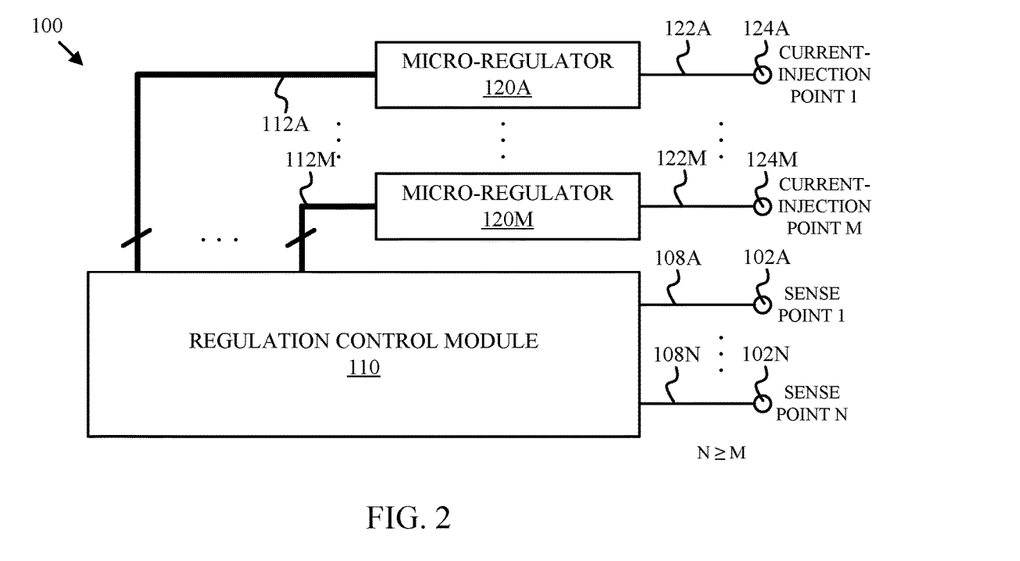
FIG. 2 is block diagram of one example of a distributed voltage regulator in accordance with at least one embodiment of the present invention.

FIG. 2 is block diagram of one example of a distributed voltage regulator 100 in accordance with at least one embodiment of the present invention. As depicted, the distributed voltage regulator 100 includes a regulation control module 110 and multiple micro-regulators 120. The distributed voltage regulator 100 provides improved voltage regulation for an integrated circuit or the like.

The regulation control module 110 receives a set of feedback signals 108 (e.g., 108A-108N) corresponding to a set of sense points 102 (e.g., 102A-102N) and provides a set of control signals 112 (e.g., 112A-112M). In the depicted embodiment, the feedback signals 108 are analog signals and the control signals 112 are digital signals that provide feedback codes to the micro-regulators 120 (e.g., 120A-120M). In some embodiments, the micro-regulators 120 comprise charge pumps and the feedback codes are UP/DOWN codes that boost or diminish the voltage on a charge pump capacitor.

The micro-regulators 120 receive the control signals 112 and provide an injection current 122 (e.g., 122A-122M) to a current injection point 124 (e.g., 124A-124M). The micro-regulators 120 may also be disposed in, or proximate to, various circuit sectors (see FIG. 1) of an integrated circuit, or the like, such that each circuit sector has one or more dedicated micro-regulators 120. The current-injection point 124 that is driven by a micro-regulator 120 may also be disposed in the same circuit sector as the micro-regulator 120.

Figure 3:
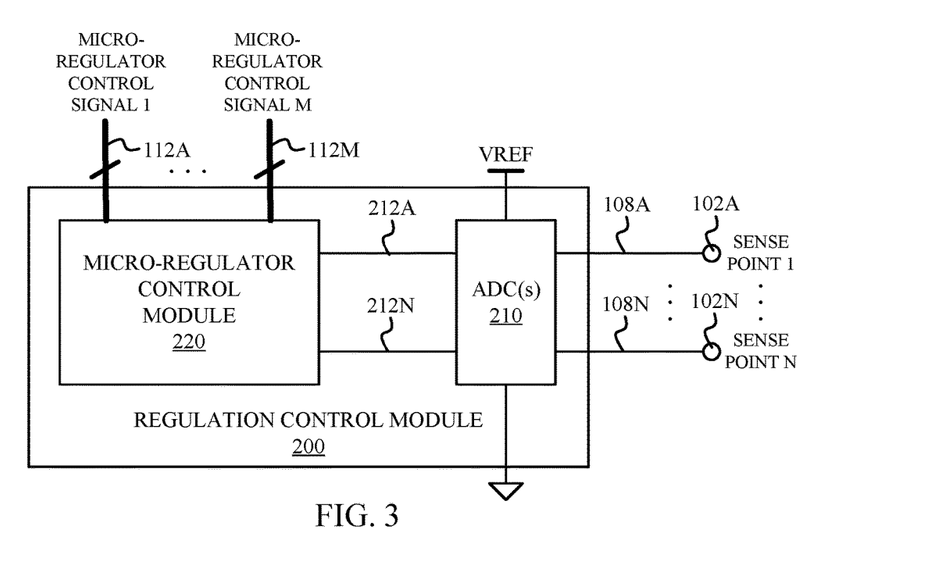
FIG. 3 is block diagram of one example of a regulation control module in accordance with at least one embodiment of the present invention.

FIG. 3 is block diagram of one example of a regulation control module 200 in accordance with at least one embodiment of the present invention. As depicted, the regulation control module 200 includes one or more voltage sensors 210 and a micro-regulator control module 220. The regulation control module 200 is one example of the regulation control module 110 depicted in FIG. 2.

The voltage sensors 210 sense the voltages of the feedback signals 108 corresponding to the sense points 102 (e.g., 102A-N) and provide sensed signals 212. The micro-regulator control module 220 receives the sensed signals 212 and provides the control signals 112 that control the micro-regulators 120. In the depicted embodiment, the voltage sensors 210 are embodied as one or more analog-to-digital converters and the sensed signals 212 are digital signals that have the sensed voltages (or an error signal for the sensed voltages) encoded thereon. In some embodiments, including versions of the depicted embodiments, the sensed signals 212 are digitized error signals that are generated by analog differencing of the feedback signals 108 to a reference voltage VREF and digitizing the resulting difference to provide the sensed signals 212.

Figures 4, 5:
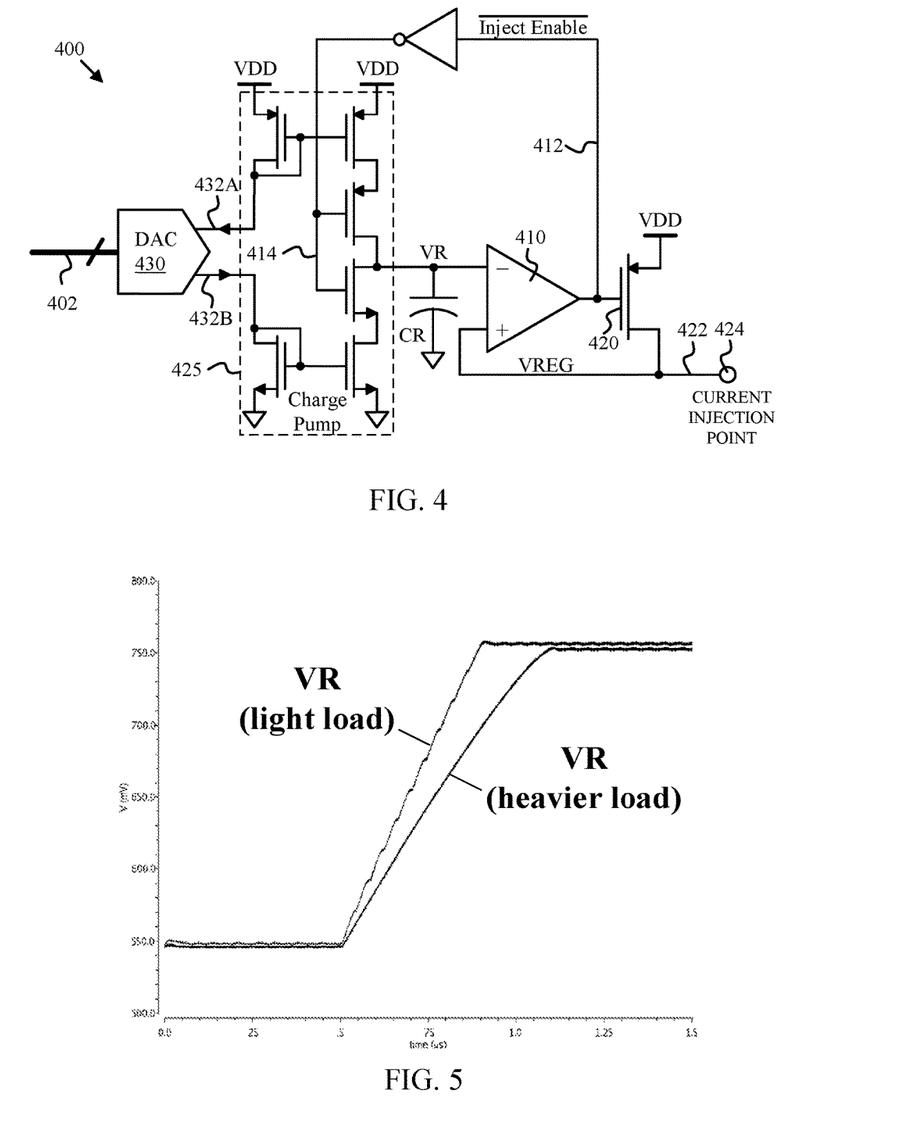
FIG. 4 is schematic diagram of one example of a voltage regulator in accordance with at least one embodiment of the present invention.
FIG. 5 is a graph that illustrates the challenge of voltage transitions associated with DVFS.

FIG. 4 is schematic diagram of one example of a voltage regulator 400 in accordance with at least one embodiment of the present invention. The voltage regulator 400 may be a micro-regulator (e.g., 120) that regulates a particular circuit sector on an integrated circuit or a centralized regulator that provides voltage regulation for an entire integrated circuit or the like.

The depicted voltage regulator 400 includes the (local) reference capacitor CR which maintains the local reference voltage VR received by the comparator 410 which, in turn, drives the current injection transistor 420. In the depicted embodiment, the charge pump 425 can adjust the reference voltage VR by sourcing current to, or sinking current from, the reference capacitor CR. The charge pump 425 may be driven by a digital-to-analog converter (DAC) 430 which receives the control signal 402 and provides differential currents 432 to the charge pump 425 and thereby controls the current provided to, or pulled from, the reference capacitor CR.

In the depicted embodiment, the differential currents 432 include an UP current 432A and a DOWN current 432B. Consequently, the control signal 402 provided as an input to the DAC 430 may be referred to as an UP/DOWN code 402 which determines a ratio of the UP (sourced) current 432A to the DOWN (sinked) current 432B. The UP/DOWN code 402 may be provided by the regulation control module 200 or the like.

In addition to the differential currents 432, another input to the charge pump 425 is the output of the comparator 410 referred to as an inject enable signal 412. In the depicted embodiment, the inject enable signal 412 is asserted with a low voltage and is inverted to generate a feedback signal 414. The polarity of the feedback signal 414 is such that the reference capacitor CR is charged upward when the current injection transistor 420 (e.g., pFET) is off, and charged downward when the current injection transistor 420 is on. Charging upward and downward in the described manner provides negative feedback and stabilizes the duty cycle of the voltage regulator 400.

While providing this negative feedback to the charge pump 425 helps stabilize the duty cycle, one of skill in the art will appreciate that gating the charging/discharging of the reference capacitor CR with the inject enable signal 412 may limit the maximum slew rate with which the reference voltage VR can be changed. If the duty cycle of the inject enable signal 412 is extremely low or extremely high, the maximum slew rate may fall to a value much smaller than the I/C ratio (that is, the ratio of the UP current or DOWN current to the value of reference capacitor CR). As mentioned earlier, the UP/DOWN currents may be selected to be small in magnitude in order to maintain loop stability with a robust phase margin. For instance, under heavy load current conditions, signal 412 will be low the majority of the time in order to keep the injection transistor 420 on most of the time and inject the needed current into the voltage regulated circuit. Hence, feedback signal 414 will be high for most of the time resulting in the reference capacitor CR being discharged with the DOWN current. In such a situation CR will be charged up for only a short amount of time with the UP current, which limits the rate VR (and similarly VREG) may be increased (even with a maximum value of UP current and a minimum value of DOWN current). In contrast, under light load conditions, signal 412 will be high most of the time, and feedback signal 414 will be low most of the time. Hence, CR will be charged up most of the time with an UP current and discharged only infrequently with a DOWN current. Therefore, the rate of lowering VR and VREG will be similarly limited.

Due to at least the foregoing, one challenge associated with voltage regulation circuits such as the voltage regulator 400 is making rapid output voltage transitions such as those associated with DVFS. FIG. 5 is waveform diagram that illustrates the challenge of voltage transitions associated with DVFS. As is shown, the ability to change the reference voltage VR (and thereby the output voltage VREG) may be dependent on the load placed on a voltage regulator. Under a heavier load, the reference voltage VR may be less responsive to a requested change and have a reduced slew rate than a lighter load. This reduced slew rate may limit the power savings that can be achieved with DVFS.

The embodiments disclosed herein recognize that the duty cycle of the voltage regulator (an inner feedback path) may provide high precision to the regulated output voltage over time and that the UP/DOWN codes enable arbitrary selection of the regulated output voltage (a potential outer feedback path). However, the embodiments disclosed herein also recognize that quick adjustments and changes in the regulated output voltage may be difficult to attain given the limited speed with which the reference capacitor CR can be charged or discharged by the UP/DOWN currents.

Figure 6A:
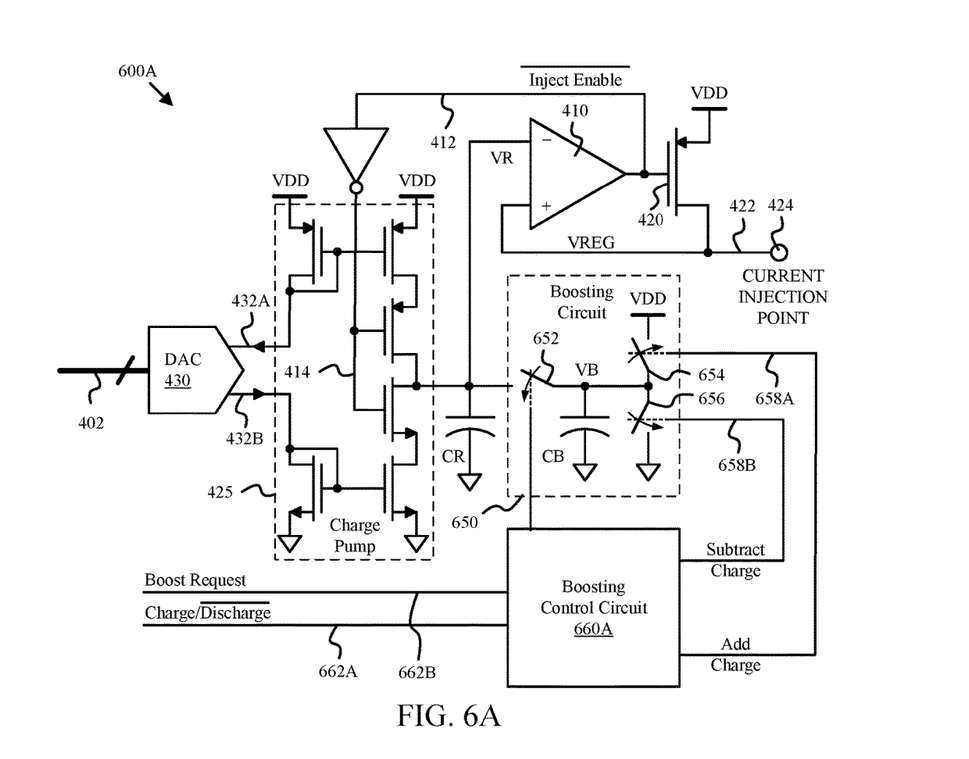
FIG. 6A is schematic diagram of one example of a voltage regulator with a boosting circuit in accordance with at least one embodiment of the present invention.

To address at least some of the above issues, a voltage regulator may be provided with a boosting circuit. FIG. 6A is schematic diagram of one example of a voltage regulator 600A that is provided with a boosting circuit 650 and a boosting control circuit 660A in accordance with at least one embodiment of the present invention. In addition to the boosting circuit 650, the voltage regulator 600A may include many or all of the elements of the voltage regulator 400 including the comparator 410, the current injection transistor 420, the charge pump 425, and the DAC 430.

The depicted boosting circuit 650 includes a boosting capacitor CB, a boost connect switch 652, a pre-charge switch 654, and a discharge switch 656. The boosting capacitor CB may be charged with a discrete amount of (positive) charge by activating the pre-charge switch 654 and connecting the boosting capacitor to a selected voltage level. In the depicted embodiment, the selected voltage level is the supply voltage.

In the depicted embodiment, the boosting capacitor CB may also be cleared of any charge (i.e., discharged) by activating the discharge switch 656. In another embodiment, switch 656 may be used to connect the boosting capacitor CB to a negative voltage supply resulting in the accumulation of a discrete amount of negative charge on the boosting capacitor CB.

The boosting capacitor CB preferably has a capacitance that is much smaller than the reference capacitor CR. The boosting capacitor CB may be connected to CR (after being charged or discharged) by activating the boost connect switch 652. The pre-charge switch 654 and the discharge switch 656 are preferably deactivated while the boost connect switch 652 is activated.

One of skill in the art will appreciate that in the depicted embodiment, the voltages on the capacitors CB and CR will average to a common voltage (upon activation of the boost connect switch 652) according to the capacitance of CB and CR, namely:

$$VAvg=(VR*CR+VB*CB)/(CB+CR) \quad (1)$$

When VB=0, then:

$$VAvg=VR*(CR)/(CB+CR) \quad (2)$$

$$VAvg=VR*(CR+CB-CB)/(CB+CR) \quad (3)$$

$$VAvg=VR*[1-CB/(CB+CR)] \quad (4)$$

Consequently, the reference voltage VR will be incrementally decreased to VAvg when VB=0. When VB=VDD=VR+dV, then:

$$VAvg=[VR*CR+(VR+dV)*CB]/(CB+CR) \quad (5)$$

$$VAvg=(VR*CR+VR*CB+dV*CB)/(CB+CR) \quad (6)$$

$$VAvg=VR+(dV*CB)/(CB+CR) \quad (7)$$

Assuming that CR>>CB, then:

$$VAvg\sim=VR+dV*(CB/CR) \quad (8)$$

$$VAvg\sim=VR+(VDD-VR)*(CB/CR) \quad (9)$$

Consequently, the reference voltage VR will be incrementally increased when VB=VDD.

The connecting of the boost connect switch 652 as well as the pre-charge and discharge switches 654 and 656 may occur at different phases of a boosting control cycle (not shown). In the depicted embodiment, a boosting control circuit 660A disconnects the boosting capacitor CB from the reference capacitor CR during a first phase of the boosting control cycle and also pre-charges or discharges the boosting capacitor CB. Whether pre-charging or discharging occurs may be determined by one or more control inputs 662, which direct the boosting control circuit 660A to generate the appropriate boosting control signals 658. For example, the depicted embodiment includes an add charge signal 658A that can be used to pre-charge the boosting capacitor CB and a subtract charge signal 658B that can be used to discharge the boosting capacitor CB.

The boosting control circuit 660A may be further configured to connect the boosting capacitor to the reference capacitor CR during a second phase of the control cycle and thereby incrementally adjust the voltage on the reference capacitor CR. In the depicted embodiment, the incremental adjustment of the voltage on the reference capacitor CR conforms to equations 1-9 shown above.

The boosting control signals 658 may be gated, or otherwise controlled, by the boosting control inputs 662. For example, in the depicted embodiment the add charge signal 658A is asserted only if a charge/discharge input 662A and a boost request input 662B are both high. Similarly, the subtract charge signal 658B is asserted only if the boost request input 662B is high and the charge/discharge input 662A is low.

One of skill in the art will appreciate that the above incremental increases or decreases in voltage may be repetitively applied at a high rate (e.g., 400 MHz). In some embodiments, a change in the output voltage of a selected magnitude is accomplished by repetitively switching switches 652, 654, and 656 a selected number of times. For example, the number of switching cycles needed to effect a selected voltage change can be computed/estimated and the boosting control circuit may be configured to automatically cycle through the computed number of switching cycles. Consequently, such a change may occur without feedback (i.e., via an open loop configuration).

Figure 6B:
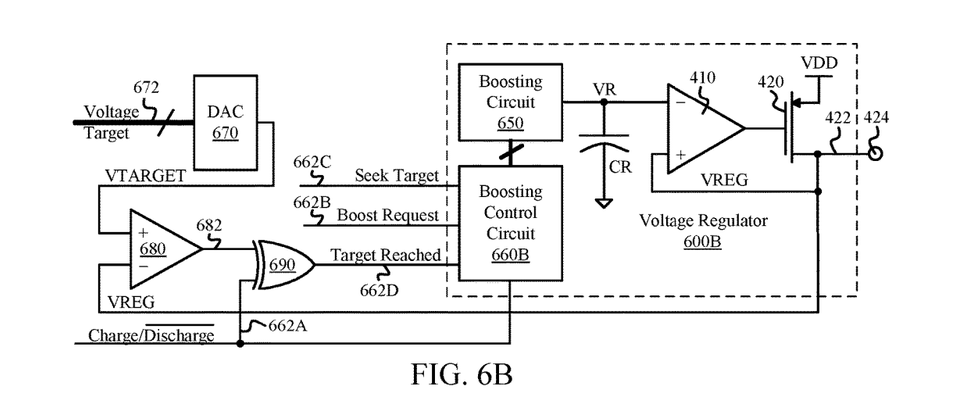
FIG. 6B is schematic diagram of one example of a voltage regulator and associated circuitry in accordance with at least one embodiment of the present invention.

FIG. 6B is schematic diagram of one example of a voltage regulator 600B and associated circuitry in accordance with at least one embodiment of the present invention. As depicted, the voltage regulator 600B is substantially similar to the voltage regulator 600A. (For clarity and simplicity purposes, the charge pump 425 and DAC 430 are omitted from FIG. 6B.) However, the voltage regulator 600B includes a boosting control circuit 660B which has extra control inputs (a seek target input 662C and a target reached input 662D) in addition to the control inputs (the charge/discharge input 662A and the boost request input 662B) already discussed with regard to the boosting control circuit 660A. These extra control inputs are used in closed-loop operation of the boosting control circuit 660B and the boosting circuit 650. One of skill in the art will appreciate that utilizing closed-loop operation (negative feedback) may increase the accuracy of voltage transitions, especially when the accuracy of the voltage decrements and increments given by equations 4 and 9 is limited by component tolerances.

In the depicted embodiment, a DAC 670 receives a voltage target 672 from a system level voltage manager (not shown) such as a DFVS controller that digitally indicates the voltage the voltage regulator 600B is to transition to. In response thereto, the depicted DAC 670 provides a target voltage signal VTARGET with the requested voltage. The system level voltage manager also instructs the boosting control circuit 660B to repeatedly increment or decrement (depending on the polarity of the charge/discharge input 662A) voltage VR by pulsing the seek target input 662C and asserting the boost request input 662B (for example, with a sequence of voltage pulses). The increments or decrements of voltage VR continue until a comparator 680, or the like, detects that the regulated output voltage VREG has reached VTARGET. Note that in the case of an upward voltage transition (with a high value of the charge/discharge input 662A), a comparator output signal 682 goes low when VREG reaches VTARGET. In the case of a downward voltage transition (with a low value of the charge/discharge input 662A), the comparator output signal 682 goes high when VREG reaches VTARGET. An exclusive-OR (XOR) gate 690 is used to generate the target reached signal 662D which is logically correct for both upward and downward voltage transitions. Upon assertion of the target reached signal 662D, the boosting control circuit 660B stops incrementing or decrementing voltage VR (until a pulse on the seek target input 662C resets the boosting control circuit 660B for the transition to the next voltage target).

Figure 7:
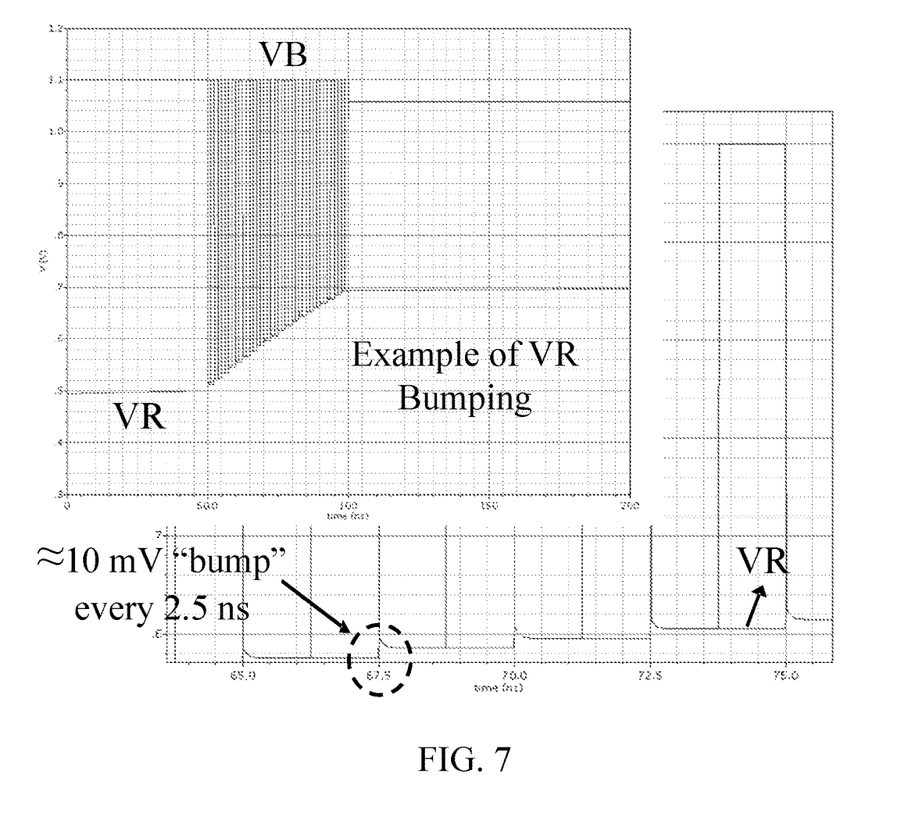
FIG. 7 is a pair of graphs that illustrate the effect of a boosting circuit in accordance with at least one embodiment of the present invention.

Referring now to FIG. 7, a boosting circuit connected to a voltage regulator may capture a boosting voltage VB on a boosting capacitor (e.g., CB in FIG. 6A) that is repetitively connected to a reference capacitor (e.g., CR in FIG. 6A) in order to make incremental changes ("bumps") in the reference voltage VR. By including a boosting circuit, faster changes in the output voltage may occur, with less dependence on the current load. In one embodiment, the maximum slew rate for a substantive current load increased from 200 mV/us to more than 1 V/us by adding a boosting circuit.

Figure 8A:
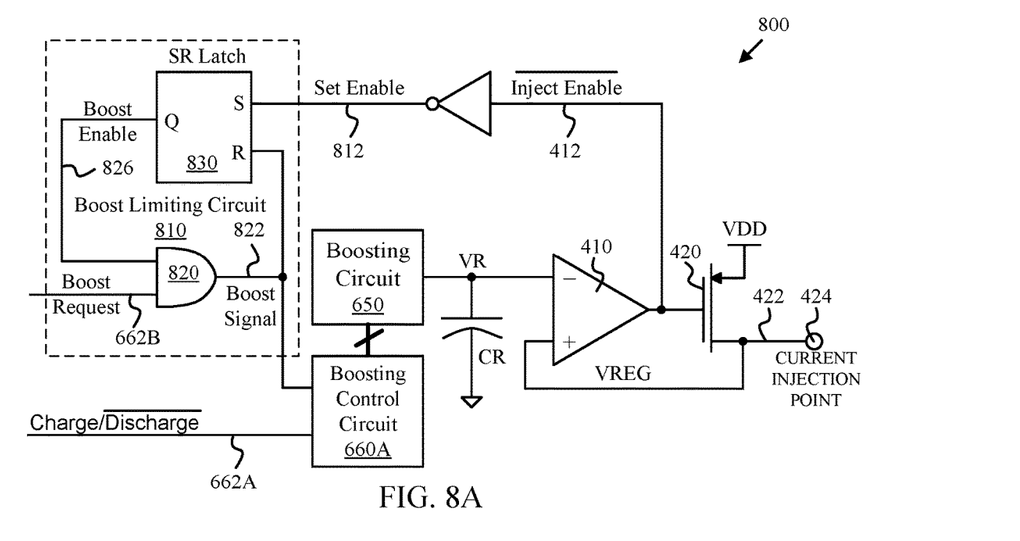
FIG. 8A is a schematic diagram depicting selected portions of a voltage regulator with a boosting circuit and a boost limiting circuit.

One issue associated with a high slew rate is that the reference voltage VR can under some conditions be increased or decreased faster than the regulated output voltage VREG can track it. For instance, the regulated output voltage VREG cannot drop faster than the load current can discharge the decoupling capacitance on the output node, so under light load conditions, it is possible for a boosting circuit to decrease the reference voltage VR faster than the regulated output voltage VREG can be discharged. This is especially problematic in closed-loop configurations such as that shown in FIG. 6B, as the mistracking between VR and VREG may result in VR being driven well past the target voltage, and the regulated output voltage VREG may exhibit severe overshooting (once it eventually catches up with VR). FIG. 8A is a schematic diagram depicting selected portions of a voltage regulator 800 that addresses this issue. As depicted, the voltage regulator 800 includes some of the same elements as the voltage regulators 400 and 600A including the comparator 410, the current injection transistor 420, and the boosting circuit 650, and the boosting control circuit 660A. In addition, the voltage regulator 800 includes a boost limiting circuit 810 that selectively limits the amount of boost provided by the boosting circuit 650. Although depicted separately, the boost limiting circuit 810 may be integrated into the boosting control circuit 660A. For clarity and simplicity purposes, the charge pump 425 and DAC 430 are omitted from FIG. 8A.

Figure 8B:
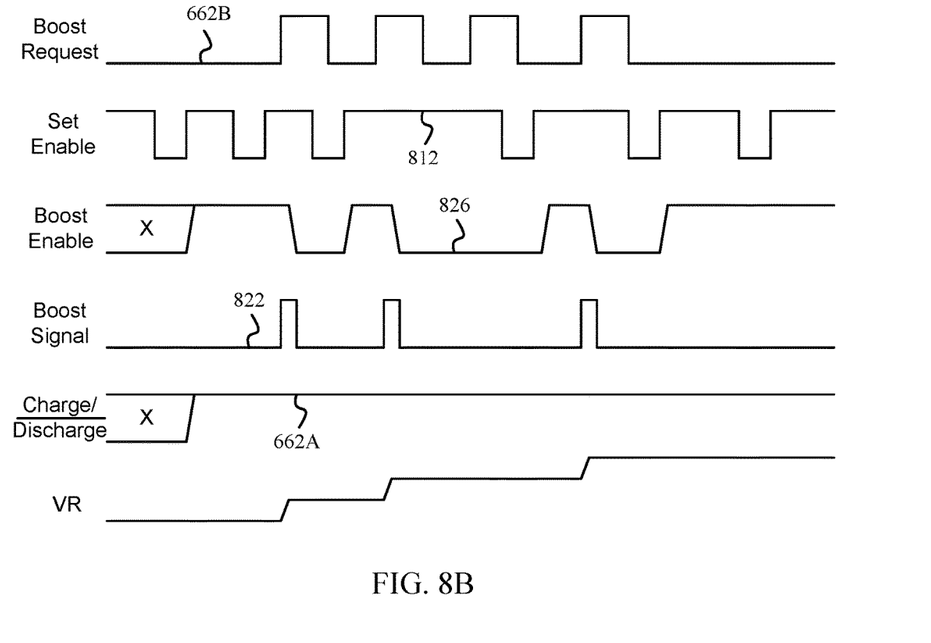
FIG. 8B is a timing diagram depicting operation of the boost limiting circuit shown in FIG. 8A.

The depicted boost limiting circuit 810 includes a boost control gate 820 and a boost enable latch 830. Referring to the timing diagram of FIG. 8B while continuing to refer to FIG. 8A, the depicted boost control gate 820 is an 'and' gate which asserts a boost signal 822 when/while a boost request signal 662B is asserted and a boost enable signal 826 is asserted. While the boost signal 822 is asserted, the boosting circuit 650 (under control of the boosting control circuit 660A) incrementally adds or subtracts charge to the reference capacitor CR and thereby incrementally changes the reference voltage VR.

In the depicted embodiment, assertion of the boost signal 822 resets the boost enable latch 830 (via an edge trigger reset input) and de-asserts the boost enable signal 826. Consequently, the boosting circuit is only momentarily active. The boost enable signal 826 remains inactive until the boost enable latch 830 is set (via an edge trigger set input) by a rising edge on a set enable signal 812, which is asserted when the output of the comparator 410 transitions from high to low. Assertion of the boost request signal 662B will then (again) result in assertion of the boost signal 822.

One of skill in the art will appreciate that repetitive "bumping" of VREG by the boosting circuit 650 will only occur when the comparator 410 repetitively generates falling edges on the inject enable signal 412, and the rising edges of the set enable signal 812 set the boost enable latch 830. Furthermore, repetitive falling edges of the inject enable signal 412 only occur when the output voltage VREG is substantially equal to the local reference voltage VR. If the regulated output voltage VREG deviates significantly from the local reference voltage VR in a positive (or negative) direction, the inject enable signal 412 will be held high (or low), and there will be no edges of any type on the inject enable signal 412. Consequently, the boost limiting circuit (a.k.a., boosting limiter) 810 effectively disables the boosting circuit 650 (e.g., via the boosting control circuit 660A) when/while the output voltage VREG deviates from the local reference voltage VR. Once VREG catches up with and begins to track VR, the inject enable signal 412 (which is the output of the comparator 410) will start toggling up and down, and the falling edges of the inject enable signal 412 will enable the boosting circuit 650. One of skill in the art will also appreciate that the depicted boost limiting circuit 810 suppresses mistracking between the local reference voltage VR and the regulated output voltage VREG, so that overshooting or undershooting during very low or very high load current situations is avoided.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus comprising:
   a reference capacitor configured to provide a local reference voltage for a voltage regulator;
   a charge pump configured to push current to, or pull current from, the reference capacitor according to one or more control inputs received by the charge pump, wherein the one or more control inputs comprise an UP current input and a DOWN current input;
   a DAC configured to provide the UP current input and the DOWN current input; and
   a boosting circuit configured to add or subtract a discrete quantity of charge to the reference capacitor according to one or more boosting control signals received by the boosting circuit.

2. The apparatus of claim 1, wherein the boosting circuit is configured to disconnect a boosting capacitor from the reference capacitor during a first phase of a control cycle and pre-charge or discharge the boosting capacitor according to the one or more boosting control signals.

3. The apparatus of claim 2, wherein the boosting control circuit is further configured to connect the boosting capacitor to the reference capacitor during a second phase of the control cycle.

4. The apparatus of claim 1, wherein the DAC is responsive to UP/DOWN codes.

5. The apparatus of claim 4, wherein the UP/DOWN codes are provided by a regulation control module that monitors an output voltage of the voltage regulator.

6. The apparatus of claim 1, further comprising a boosting limiter.

7. The apparatus of claim 6, wherein the boosting limiter disables the boosting circuit while an output voltage of the regulator deviates from the local reference voltage.

8. The apparatus of claim 7, wherein the boosting limiter enables the boosting circuit while the output voltage of the regulator tracks the local reference voltage.

9. A method comprising:
   providing a reference capacitor configured to provide a local reference voltage for a voltage regulator;
   pushing current to, and pulling current from, the reference capacitor with a charge pump according to one or more control inputs for the charge pump;
   wherein the one or more control inputs comprise an UP current input and a DOWN current input;
   providing the UP current input and the DOWN current input with a digital-to-analog converter (DAC); and
   adding or subtracting a discrete quantity of charge to the reference capacitor according to one or more boosting control signals.

10. The method of claim 9, further comprising disconnecting a boosting capacitor from the reference capacitor during a first phase of a control cycle.

11. The method of claim 10, further pre-charging or discharging the boosting capacitor according to the one or more boosting control signals during the first phase of the control cycle.

12. The method of claim 11, further comprising connecting the boosting capacitor to the reference capacitor during a second phase of the control cycle.

13. The method of claim 9, further comprising providing the UP current input and the DOWN current input with a digital-to-analog converter (DAC).

14. The method of claim 13, wherein the DAC is responsive to UP/DOWN codes.

15. The method of claim 9, further comprising disabling changes to the charge on the reference capacitor while an output voltage of the voltage regulator deviates from the local reference voltage.

16. An apparatus comprising:
   an integrated circuit; and
   one or more micro-regulators disposed within the integrated circuit each micro-regulator comprising:
      a reference capacitor configured to provide a local reference voltage,
      a charge pump configured to push current to, or pull current from, the reference capacitor according to one or more control inputs received by the charge pump, wherein the one or more control inputs comprise an UP current input and a DOWN current input,
      a DAC configured to provide the UP current input and the DOWN current input, and
      a boosting circuit configured to add or subtract a discrete quantity of charge to the reference capacitor according to one or more boosting control signals received by the boosting circuit.

17. The apparatus of claim 16, wherein the boosting circuit is configured to disconnect a boosting capacitor from the reference capacitor during a first phase of a control cycle and pre-charge or discharge the boosting capacitor according to the one or more boosting control signals.

18. The apparatus of claim 17, wherein the boosting control circuit is further configured to connect the boosting capacitor to the reference capacitor during a second phase of the control cycle.

* * * * *